US 11,346,697 B2

(12) United States Patent
Ramspeck

(10) Patent No.: US 11,346,697 B2
(45) Date of Patent: May 31, 2022

(54) SYSTEM AND METHOD FOR REMOTE METERING STATION SENSOR CALIBRATION AND VERIFICATION

(71) Applicant: NORDSON CORPORATION, Westlake, OH (US)

(72) Inventor: Alan R. Ramspeck, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 293 days.

(21) Appl. No.: 16/529,596

(22) Filed: Aug. 1, 2019

(65) Prior Publication Data

US 2020/0049542 A1 Feb. 13, 2020

Related U.S. Application Data

(60) Provisional application No. 62/715,895, filed on Aug. 8, 2018.

(51) Int. Cl.
*G01F 1/78* (2006.01)
*G01F 25/00* (2022.01)
*G01D 4/00* (2006.01)
*G01F 1/50* (2006.01)
*G01F 1/40* (2006.01)

(52) U.S. Cl.
CPC .............. *G01F 1/78* (2013.01); *G01D 4/002* (2013.01); *G01F 1/50* (2013.01); *G01F 25/0007* (2013.01); *G01F 1/40* (2013.01); *G01F 25/00* (2013.01)

(58) Field of Classification Search
CPC .............................. G01F 25/00; G01F 25/0007
See application file for complete search history.

(56) References Cited

U.S. PATENT DOCUMENTS

| 4,682,710 A | * | 7/1987 | Turner, Jr | B05B 9/0406 |
| | | | | 118/683 |
| 2014/0318210 A1 | | 10/2014 | Tremel | |
| 2017/0284844 A1 | | 10/2017 | Fort et al. | |
| 2018/0065142 A1 | | 3/2018 | Saine | |

* cited by examiner

*Primary Examiner* — Erika J Villaluna
(74) *Attorney, Agent, or Firm* — BakerHostetler

(57) ABSTRACT

Calibrating a plurality of fluid sensors of a remote metering system is disclosed. The system includes a material supply device including a main pump and a main flow sensor for monitoring an output of the main pump. The application system also includes a remote metering system for receiving the material flowing from the material supply device and applying the material to substrates. The remote metering system includes a first applicator assembly including a first applicator and a first flow sensor for monitoring an output of the first applicator, and a second applicator assembly including a second applicator and a second flow sensor for monitoring an output of the second applicator. The remote metering system further includes a controller in signal communication with the remote metering station and the material supply device. The controller performs a first and second calibration operations on the first and second flow sensors, respectively.

20 Claims, 7 Drawing Sheets

SYSTEM AND METHOD FOR REMOTE METERING STATION SENSOR CALIBRATION AND VERIFICATION

CROSS REFERENCE TO RELATED APPLICATIONS

This application claims the benefit of U.S. Provisional Patent App. No. 62/715,895, filed Aug. 8, 2018, the disclosure of which is hereby incorporated by reference herein.

TECHNICAL FIELD

This application is directed to a system and method for controlling operation of an application system for applying a material to a substrate. Specifically, this application relates to a system and method for calibrating and verifying the accuracy of sensors in communication with a plurality of applicators.

BACKGROUND

Typical material application systems for applying material to a substrate include a storage device that provides a supply of material to any number of applicators, each of which are capable of applying the material to a substrate. However, the storage device and applicators can be spaced apart, which causes the material to travel a distance between the storage device and the applicators. When the flow of material reaches a remote metering station, the material can be divided into a plurality of separate flows, where each of the separate flows is directed to a respective applicator. Based upon the requirements of a particular application operation, it may be desirable for each of the applicators to apply the material to a substrate at different rates and in different volumes.

Due to the specific requirements that an application operation may have, any deviation from application parameters may result in the creation of substandard or unusable products. If left uncorrected, this issue can lead to significant material and financial losses. To ensure the consistency of the flow rates within each applicator, each applicator can be in communication with a respective material flow sensor that monitors a characteristic of the material flow. Because these flow sensors typically must have smaller dimensions to accommodate their desired operational locations, they may have a higher level of inaccuracy than other types of flow sensors. Additionally, these flow sensors can be sensitive to changes in material temperature and viscosity. If uncorrected, these flow sensors may provide inaccurate readings to an operator of the application system, which can lead the operator to mistakenly believe that the applied material patterns meet the required specifications.

As a result, there is a need for an application system that can calibrate and verify the accuracy of the sensors in communication with each of the material applicators.

SUMMARY

An embodiment of the present disclosure is a method of calibrating a plurality of fluid sensors of a remote metering system. The method includes pumping material from a main pump to a first applicator, and receiving a first feedback signal from a main flow sensor in communication with the main pump and a second feedback signal from a first flow sensor in communication with the first applicator. The first and second feedback signals are indicative of characteristics of material flow through the main pump and the first applicator, respectively. The method also includes comparing the first and second feedback signals, determining a compensation factor for the first flow sensor, and stopping material flow to the first applicator. The method further includes pumping the material from the main pump to a second applicator, and receiving a third feedback signal from the main flow sensor and a fourth feedback signal from a second flow sensor in communication with the second applicator. The third and fourth feedback signals are indicative of characteristics of the material flow through the main pump and the second applicator, respectively. Additionally, the method includes comparing the third and fourth feedback signal, and determining a compensation factor for the second flow sensor.

Another embodiment of the present disclosure is an application system for applying a material to a substrate. The application system includes a material supply device comprising a main pump and a main flow sensor for monitoring an output of the main pump. The application system also includes a remote metering system for receiving the material flowing from the material supply device and applying the material to substrates. The remote metering system comprises a first applicator assembly including a first applicator and a first flow sensor for monitoring an output of the first applicator, and a second applicator assembly including a second applicator and a second flow sensor for monitoring an output of the second applicator. The remote metering system further includes a controller in signal communication with the remote metering station and the material supply device. The controller is configured to perform a first calibration operation, where the controller is configured to direct the main pump to pump the material to the first applicator, receive a first feedback signal from the main flow sensor and a second feedback signal from the first flow sensor, compare the first and second feedback signals, and determine a compensation factor for the first flow sensor. The controller is also configured to stop material flow to the first applicator, and perform a second calibration operation, where the controller is configured to direct the main pump to pump the material to the second applicator, receive a third feedback signal from the main flow sensor and a fourth feedback signal from the second flow sensor, compare the third and fourth feedback signals, and determine a compensation factor for the second flow sensor.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
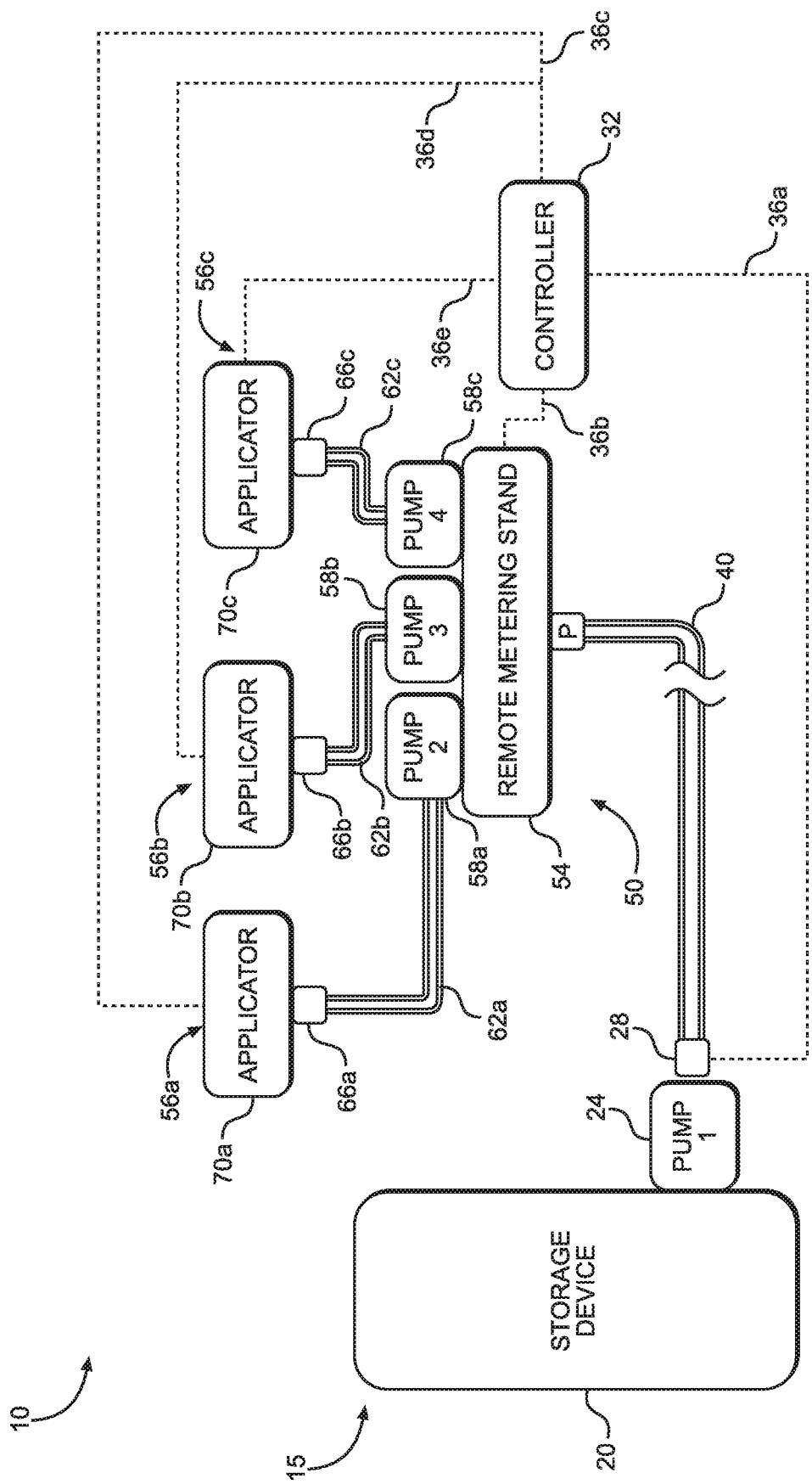
FIG. 1 is a schematic view of an application system according to an embodiment of the present disclosure.

Embodiments of the present invention include an application system 10 for dispensing a material from a plurality of applicators. Referring to FIG. 1, the application system 10 includes a material supply device 15 having a storage device 20 for storing a supply of the material. In one embodiment, the material supply device 15 is a melter suitable for heating and pumping any conventional type of hot-melt adhesive, and likewise the material is a hot-melt adhesive. The storage device 20 can be a conventional storage tank in the material supply device 15, or a remote hopper, such as a bin, that can store unmelted hot melt adhesive particulates. Additionally, the material can alternatively be other heated or unheated materials such as lotions, fragrances, and odor control products.

The material supply device 15 also includes a main pump 24 for pumping the material. In one embodiment, the main pump 24 can be a conventional gear pump having a dedicated drive motor for driving the gears, though other types of pumps are contemplated, such as gerotor or piston pumps. The material supply device 15 also includes a main flow sensor 28 in fluid communication with the main pump 24, where the main flow sensor 28 is configured to monitor the output of material from the main pump 24. The main flow sensor 28 can be a gear-type flow meter, though other types of flow sensors are contemplated, such as turbine, vortex, or hot wire anemometry sensors. The main flow sensor 28 can be in wireless and/or wired communication with a controller 32, which will be described further below, through signal connection 36a, such that the main flow sensor 28 can provide a feedback signal to the controller 32 through signal connection 36a that is indicative of some characteristic of the output of the main pump 24. For example, the feedback signal from the main flow sensor 28 can be proportional to a volumetric flow rate of the output of the main pump 24. Alternatively, the feedback signal from the main flow sensor 28 can be proportional to a mass flow rate of the output of the main pump 24. However, it is contemplated that the main flow sensor 28 can measure any other feature of the output. For example, the feedback signal from the main flow sensor 28 can include a plurality of pulses that each indicate a fixed, predetermined volume output by the main pump 24. Further, the feedback signal from the main flow sensor 28 can include an electrical signal, e.g., voltage or amperage, that corresponds to a known flow rate.

The controller 32 can comprise any suitable computing device configured to execute a software application for monitoring and controlling various operations of the application system 10 as described herein. It will be understood that the controller 32 can be a processor, a desktop computing device, a server computing device, or a portable computing device, such as a laptop, tablet, or smart phone. Specifically, the controller 32 can include a memory (not shown) and a Human Machine Interfaces (HMI) (not shown). The memory can be volatile (such as some types of RAM), non-volatile (such as ROM, flash memory, etc.), or a combination thereof. The controller 32 can include additional storage (e.g., removable storage and/or non-removable storage) including, but not limited to, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 32. The HMI device can include inputs that provide the ability to interact with the controller 32, via, for example, buttons, soft keys, a mouse, voice actuated controls, a touch screen, movement of the controller 32, visual cues (e.g., moving a hand in front of a camera on the controller 32), or the like. The HMI device can provide outputs via a graphical user interface, including visual information, such as the visual indication of current flow characteristics of various portions of the application system 10, as well as acceptable ranges for these parameters via a display. Other outputs can include audio information (e.g., via a speaker), mechanically (e.g., via a vibrating mechanism), visual (e.g., via a light tower), or a combination thereof. In various configurations, the HMI device can include a display, a touch screen, a keyboard, a mouse, a motion detector, a speaker, a microphone, a camera, or any combination thereof. The HMI device can further include any suitable device for inputting biometric information, such as, for example, fingerprint information, retinal information, voice information, and/or facial characteristic information, for instance, so as to require specific biometric information for accessing the controller 32.

The material supply device 15 can be connected to a hose 40, which provides a path for the material from the material supply device 15 to a remote metering system 50. The hose 40 allows the material supply device 15 and the remote metering system 50 to be spaced any desired distance apart on a shop floor. The remote metering system 50 is configured to receive the material flowing through the hose 40 from the material supply device 15 and apply the material to a single substrate or a plurality of substrates at once, depending on the particular configuration of the application system 10. The remote metering system 50 can have a remote metering stand 54 that receives the material output through the hose 40. The remote metering stand 54 can comprise a manifold having an input, a plurality of outputs, and a system of passages therein for dividing the flow between the plurality of outputs. The remote metering stand 54 can include a diverter for selectively changing the division of material flow between the plurality of outputs, though the division of material flow can be a constant. The remote metering stand 54 can be comprised as an assembly of individual parts, such that the size, shape, and/or arrangement of the remote metering stand 54 can be altered by an operator of the application system 10 as desired to suit a particular material application operation. Components of the remote metering stand 54 can be in wireless and/or wired communication with the controller through signal connection 36b.

The remote metering stand 54 can be configured such that a plurality of applicator assemblies can be attached thereto. In one embodiment, each applicator assembly can include a respective remote metering stand (RMS) pump, supply hose, applicator flow sensor, and applicator. However, this list is not meant to be exhaustive, and each applicator assembly can include more or less components as deemed necessary for a particular application operation. In the depicted embodiment, the remote metering system 50 includes three applicator assemblies: a first applicator assembly 56a, a second applicator assembly 56b, and a third applicator assembly 56c. The first applicator assembly 56a can include a first RMS pump 58a, a first supply hose 62a for transferring a first portion of the material flow from the first RMS pump 58*a*, and a first applicator 70*a* for receiving the first portion of the material flow from the first supply hose 62*a* and applying the first portion to a substrate. The first applicator assembly 56*a* can also include a first flow sensor 66*a* for monitoring the material flow provided to the first applicator 70*a*. The first flow sensor 66*a* can be in wired and/or wireless communication with the controller 32 through signal connection 36*c*, which allows the first flow sensor 66*a* to provide a feedback signal to the controller 32 that is indicative of some characteristic of the material flow provided to the first applicator 70*a*. For example, the feedback signal from the first flow sensor 66*a* can be proportional to a volumetric flow rate of the material flow provided to the first applicator 70*a*. Alternatively, the feedback signal from the first flow sensor 66*a* can be proportional to a mass flow rate of the material flow provided to the first applicator 70*a*. However, it is contemplated that the first flow sensor 66*a* can measure any other feature of the material flow.

The second applicator assembly 56*b* can include a second RMS pump 58*b*, a second supply hose 62*b* for transferring a second portion of the material flow from the second RMS pump 58*b*, and a second applicator 70*b* for receiving the second portion of the material flow from the second supply hose 62*b* and applying the second portion to a substrate. The second applicator assembly 56*b* can also include a second flow sensor 66*b* for monitoring the material flow provided to the second applicator 70*b*. The second flow sensor 66*b* can be in wired and/or wireless communication with the controller 32 through signal connection 36*d*, which allows the second flow sensor 66*b* to provide a feedback signal to the controller 32 that is indicative of some characteristic of the material flow provided to the first applicator 70*a*. For example, the feedback signal from the second flow sensor 66*b* can be proportional to a volumetric flow rate of the material flow provided to the second applicator 70*b*. Alternatively, the feedback signal from the second flow sensor 66*b* can be proportional to a mass flow rate of the material flow provided to the second applicator 70*b*. However, it is contemplated that the second flow sensor 66*b* can measure any other feature of the material flow.

Further, the third applicator assembly 56*c* can include a third RMS pump 58*c*, a third supply hose 62*c* for transferring a third portion of the material flow from the third RMS pump 58*c*, and a third applicator 70*c* for receiving the third portion of the material flow from the third supply hose 62*c* and applying the third portion to a substrate. The third applicator assembly 56*c* can also include a third flow sensor 66*c* for monitoring the output of the third applicator 70*c*. The third flow sensor 66*c* can be in wired and/or wireless communication with the controller 32 through signal connection 36*e*, which allows the third flow sensor 66*c* to provide a feedback signal to the controller 32 that is indicative of some characteristic of the material flow provided to the third applicator 70*c*. For example, the feedback signal from the third flow sensor 66*c* can be proportional to a volumetric flow rate of the material flow provided to the third applicator 70*c*. Alternatively, the feedback signal from the third flow sensor 66*c* can be proportional to a mass flow rate of the material flow provided to the third applicator 70*c*. However, it is contemplated that the third flow sensor 66*c* can measure any other feature of the material flow.

Though the first, second, and third applicator assemblies 56*a*-56*c* are shown and described as being substantially the same, they can differ depending on the requirements of a particular dispensing operation. Also, though only three applicator assemblies 56*a*-56*c* are depicted as included in the remote metering system 50, the remote metering system 50 can include more or less applicator assemblies as desired. For example, the remote metering system 50 can include one applicator assembly, two applicator assemblies, or more than three applicator assemblies.

Each of the RMS pumps 58*a*-58*c* can be a gear pump or any other type of pump conventionally utilized to pump a flowable material. Though depicted as connected to applicators 70*a*-70*c* via supply hoses 62*a*-62*c*, respectively, in other embodiments the RMS pumps 58*a*-58*c* can be directly connected to the applicators 70*a*-70*c*. Each of the flow sensors 66*a*-66*c* can be anemometry sensors, which can allow the flow sensors 66*a*-66*c* to have a low profile, thus allowing them to be close to or integrated in the respective applicators 70*a*-70*c*. However, the flow sensors 66*a*-66*c* can also be gear-type flow meters or any type of flow meters that are conventionally used to measured fluid flow that output a plurality of signals that are each indicative of a predetermined volume of material. Additionally, each of the applicators 70*a*-70*c* can include non-contact, contact, time-pressure dispensing, jetting, etc. dispensers for applying the material to a substrate.

In operation, the controller 32 is configured to control the operation of the components of the application system 10. The controller 32 can perform this functionality autonomously, through user input, or a combination of the two. Because the application system 10 can apply material to substrates at a high speed, such as at a rate of over a thousand product substrate segments per minute, any deviation from an intended material flow dispensing amount or speed can be highly detrimental and lead to substandard or unsalable product. To prevent this, it is essential that the flow sensors 66*a*-66*c* are operated with a high level of accuracy and precision. To ensure accuracy of the flow sensors 66*a*-66*c*, it is desirable to perform a calibration operation on the flow sensors 66*a*-66*c* prior to beginning a dispensing operation. It is further highly desired that this calibration operation be automated to the greatest extent practical.

In steady state operation, the controller 32 can direct the main pump 24 to pump a material from the storage device 20, through the hose 40, and to the remote metering system 50. Then, the remote metering stand 54 can split the flow into three separate flows, each being delivered to a respective one of the applicator assemblies 56*a*-56*c*, which can each apply the material to the intended substrates. However, prior to steady state operation, the controller 32 can calibrate the flow sensors 66*a*-66*c* such that an operator of the application system 10 can be confident that the readings received from the flow sensors 66*a*-66*c* have the highest degree of accuracy. To achieve this, the controller 32 can direct the components of the application system 10 to perform a system-wide calibration operation, which involves several discrete calibration operations.

Figure 2:
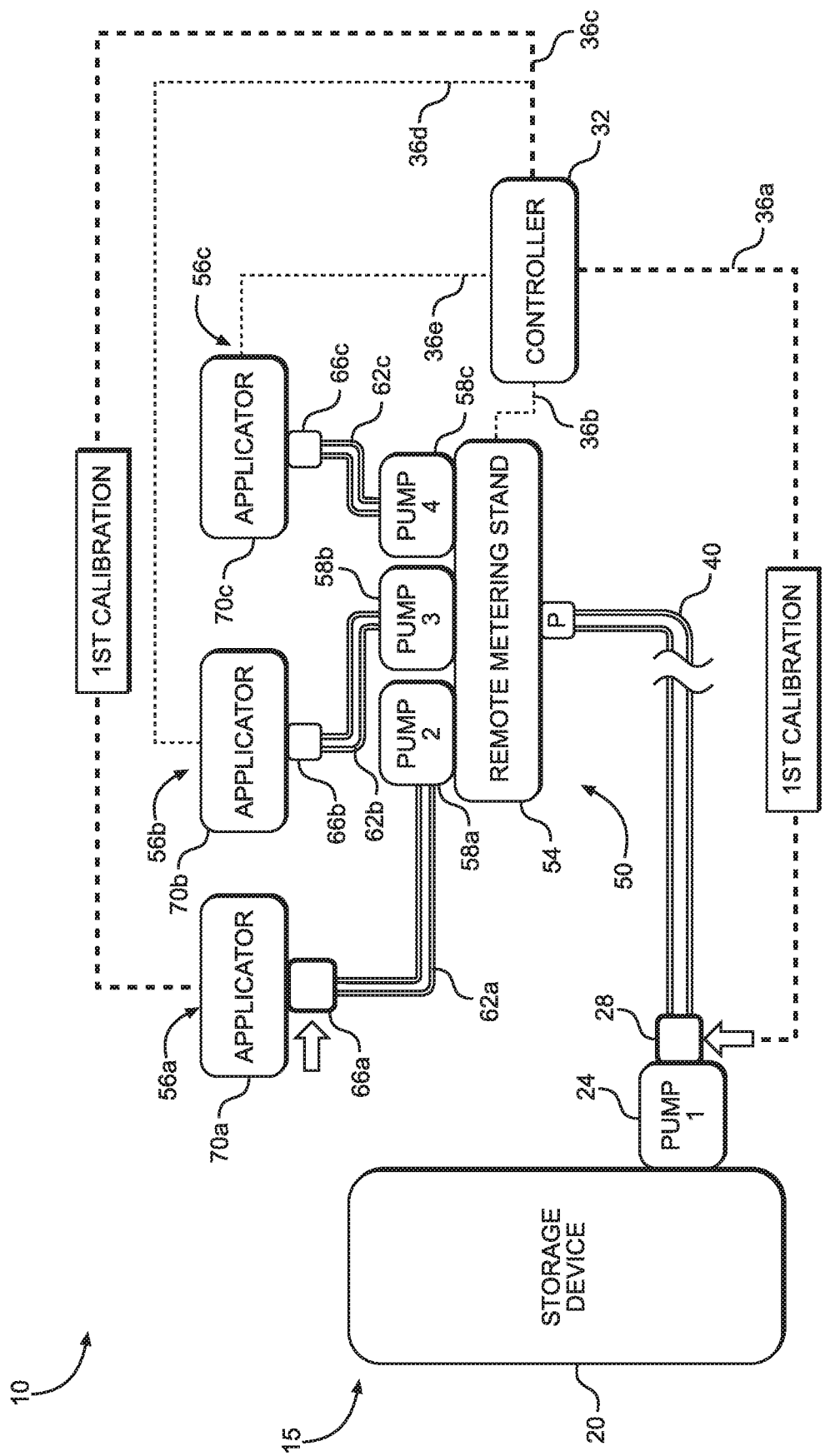
FIG. 2 is a schematic view of the application system shown in FIG. 1, with a controller performing a first calibration operation on a first flow sensor.

Initially, the controller 32 can direct the application system 10 to perform a first calibration operation (shown in FIG. 2), where the controller 32 directs the main pump 24 to pump the material from the storage device 20 to the remote metering system 50, where the remote metering stand 54 directs the flow of material solely to the first applicator 70*a*. This first calibration operation is intended to calibrate the first flow sensor 66*a* of the first applicator assembly 56*a*. During this calibration operation, the first RMS pump 58*a* may not be operating, such the material flow encountered by the main flow sensor 28 most accurately reflects the material flow encountered by the first flow sensor 66*a*. While the flow of material is being directed solely to the first applicator 70*a*, the main flow sensor 28 is configured to monitor a characteristic of the material flow flowing out of the main pump 24 and transmit a first feedback signal that is indicative of the characteristic to the controller 32 through the signal connection 36a. Concurrently, the first flow sensor 66a is configured to monitor a characteristic of the material flow to the first applicator 70a and transmit a second feedback signal that is indicative of the characteristic to the controller 32 through the signal connection 36c. For example, the characteristic can be mass flow rate, volumetric flow rate, etc.

The controller 32 is configured to receive the first feedback signal from the main flow sensor 28 and the second feedback signal from the first flow sensor 66a and compare the first and second feedback signals. Ideally, the first and second feedback signals will represent identical material flow characteristics. However, in operation the first and second feedback signals may differ, which can be indicative of either a flaw in, need for calibration of, or other problem with the first flow sensor 66a. As such, to ensure that the first flow sensor 66a is providing accurate readings, the controller 32 can determine a compensation factor for the first flow sensor 66a that compensates for the deviation in the feedback received from the first flow sensor 66a based on differences between the first and second feedback signals. The compensation factor can be determined according to a lookup table, calculation, or other such means. This compensation factor can be automatically applied to future feedback signals received by the controller 32 from the first flow sensor 66a, and thus allow the controller 32, and likewise the operator of the application system 10, to most accurately monitor the flow characteristics of material flowing through the first applicator assembly 56a.

Figure 3:
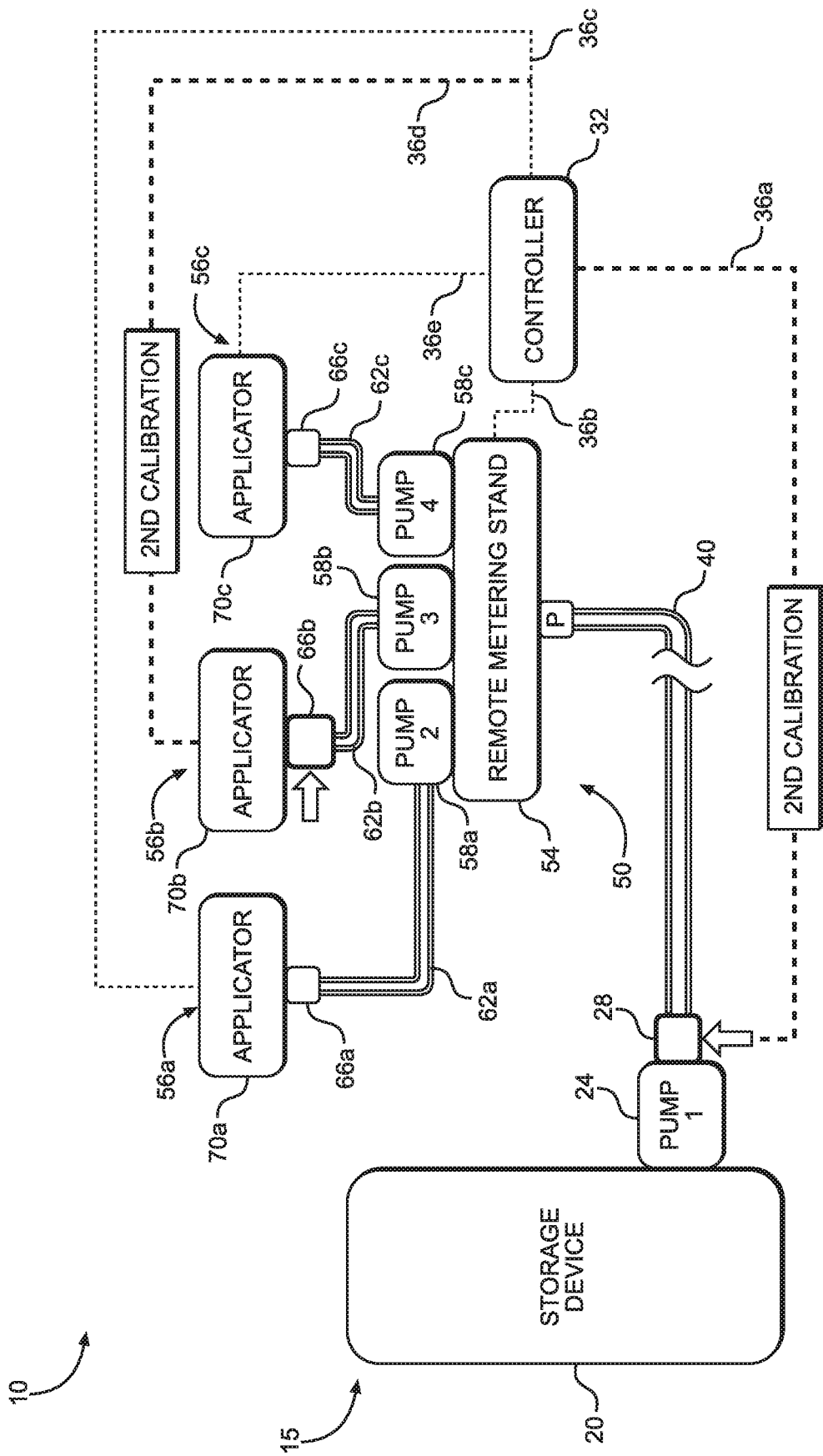
FIG. 3 is a schematic view of the application system shown in FIG. 1, with the controller performing a second calibration operation on a second flow sensor.

Once the first compensation factor is determined, the controller 32 can stop the material flow to the first applicator 70a and subsequently direct the application system 10 to perform a second calibration operation (shown in FIG. 3). In the second calibration operation, the controller 32 directs the main pump 24 to again pump the material from the storage device 20 to the remote metering system 50. However, in the second calibration operation, the remote metering stand 54 directs the flow of material solely to the second applicator 70b. The second calibration operation is intended to calibrate the second flow sensor 66b of the second applicator assembly 56b. During this calibration operation, the second RMS pump 58b may not be operating, such that the material flow encountered by the main flow sensor 28 most accurately reflects the material flow encountered by the second flow sensor 66b. While the flow of material is being directed solely to the second applicator 70b, the main flow sensor 28 is configured to monitor a characteristic of the material flow flowing out of the main pump 24 and transmit a third feedback signal that is indicative of the characteristic to the controller 32 through the signal connection 36a. Concurrently, the second flow sensor 66b is configured to monitor a characteristic of the material flow to the second applicator 70b and transmit a fourth feedback signal that is indicative of the characteristic to the controller 32 through the signal connection 36d. For example, the characteristic can be mass flow rate, volumetric flow rate, etc.

The controller 32 is configured to receive the third feedback signal from the main flow sensor 28 and the fourth feedback signal from the second flow sensor 66b and compare the third and fourth feedback signals. Ideally, the third and fourth feedback signals will represent identical material flow characteristics. However, in operation the third and fourth feedback signals may differ, which can be indicative of a flaw or other problem with the second flow sensor 66b. As such, to ensure that the second flow sensor 66b is providing accurate readings, the controller 32 can determine a compensation factor for the second flow sensor 66b that compensates for the deviation in feedback received from the second flow sensor 66b based on differences between the third and fourth feedback signals. The compensation factor can be determined according to a lookup table, calculation, or other such means. This compensation factor can be automatically applied to future feedback signals received by the controller 32 from the second flow sensor 66b, and thus allow the controller 32, and likewise the operator of the application system 10, to most accurately monitor the flow characteristics of material flowing through the second applicator assembly 56b.

Figure 4:
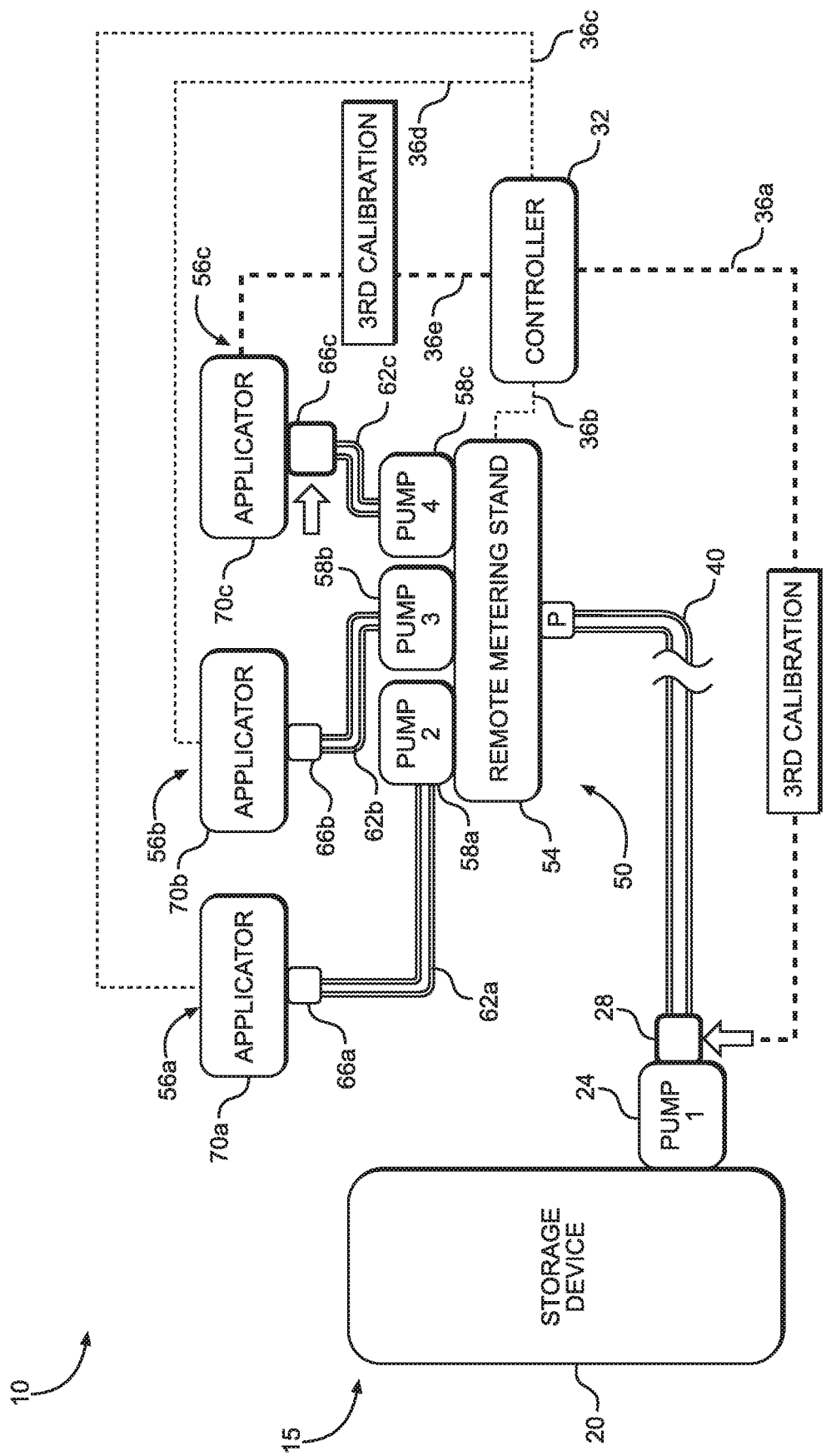
FIG. 4 is a schematic view of the application system shown in FIG. 1, with the controller performing a third calibration operation on a third flow sensor.

In applicator systems that include a third applicator assembly 56c, once the second compensation factor is determined, the controller 32 can stop the material flow to the second applicator 70b, and subsequently direct the application system 10 to perform a third calibration operation (shown in FIG. 4). In the third calibration operation, the controller 32 directs the main pump 24 to pump the material from the storage device 20 to the remote metering system 50, where the remote metering stand 54 directs the flow of material solely to the third applicator 70c. The third calibration operation is intended to calibrate the third flow sensor 66c of the third applicator assembly 56c. During this calibration operation, the third RMS pump 58c may not be operating, such that the material flow encountered by the main flow sensor 28 most accurately reflects the material flow encountered by the third flow sensor 66c. When the flow of material is being directed solely to the third applicator 70c, the main flow sensor 28 is configured to monitor a characteristic of the material flow flowing out of the main pump 24 and transmit a fifth feedback signal that is indicative of the characteristic through the signal connection 36a. Concurrently, the third flow sensor 66c is configured to monitor a characteristic of the material flow to the third applicator 70c, and transmit a sixth feedback signal that is indicative of the characteristic through the signal connection 36e. For example, the characteristic can be mass flow rate, volumetric flow rate, etc.

The controller 32 is configured to receive the fifth feedback signal from the main flow sensor 28 and the sixth feedback signal from the third flow sensor 66c and compare the fifth and sixth feedback signals. Ideally, the fifth and sixth feedback signals will represent identical material flow characteristics. However, in operation the fifth and sixth feedback signals may differ, which can be indicative of a flaw or other problem with the third flow sensor 66c. As such, to ensure the third flow sensor 66c is providing accurate readings, the controller 32 can determine a compensation factor for the third flow sensor 66c that compensates for the deviation in the feedback received from the third flow sensor 66c based on differences between the fifth and sixth feedback signals. The compensation factor can be determined according to a lookup table, calculation, or other such means. This compensation factor can be automatically applied to future feedback signals received by the controller 32 from the third flow sensor 66c, and thus allow the controller 32, and likewise the operator of the application system 10, to most accurately monitor the flow characteristics of material flowing through the third applicator assembly 56c.

Though the system-wide calibration operation is described as including three calibration operations, the present disclosure is not intended to be limited to such. For example, in another embodiment, the application system 10 can include more than three applicator assemblies, and thus a calibration operation performed by the controller 32 can include more than three discrete calibration operations. Alternatively, the controller 32 may be configured to perform a calibration operation that does not perform a distinct calibration operation on each applicator assembly, such that the calibration operation performs less calibration operations than the application system 10 has applicator assemblies. Further, the controller 32 can be configured to repeat the calibration operation over time. For example, the controller 32 can repeat the calibration operation at predetermined milestones, such as upon startup of the application system 10 after a period of inactivity, upon commencing a new dispensing operation, upon dispensing a new material, etc. Alternatively, the calibration operation can be repeated at predetermined intervals, such as after applying the material to a set number of substrates, after a set volume or mass of the material has been dispensed, etc. Also, an operator of the application system can instruct the controller 32 to perform the calibration operation on demand.

Figure 5:
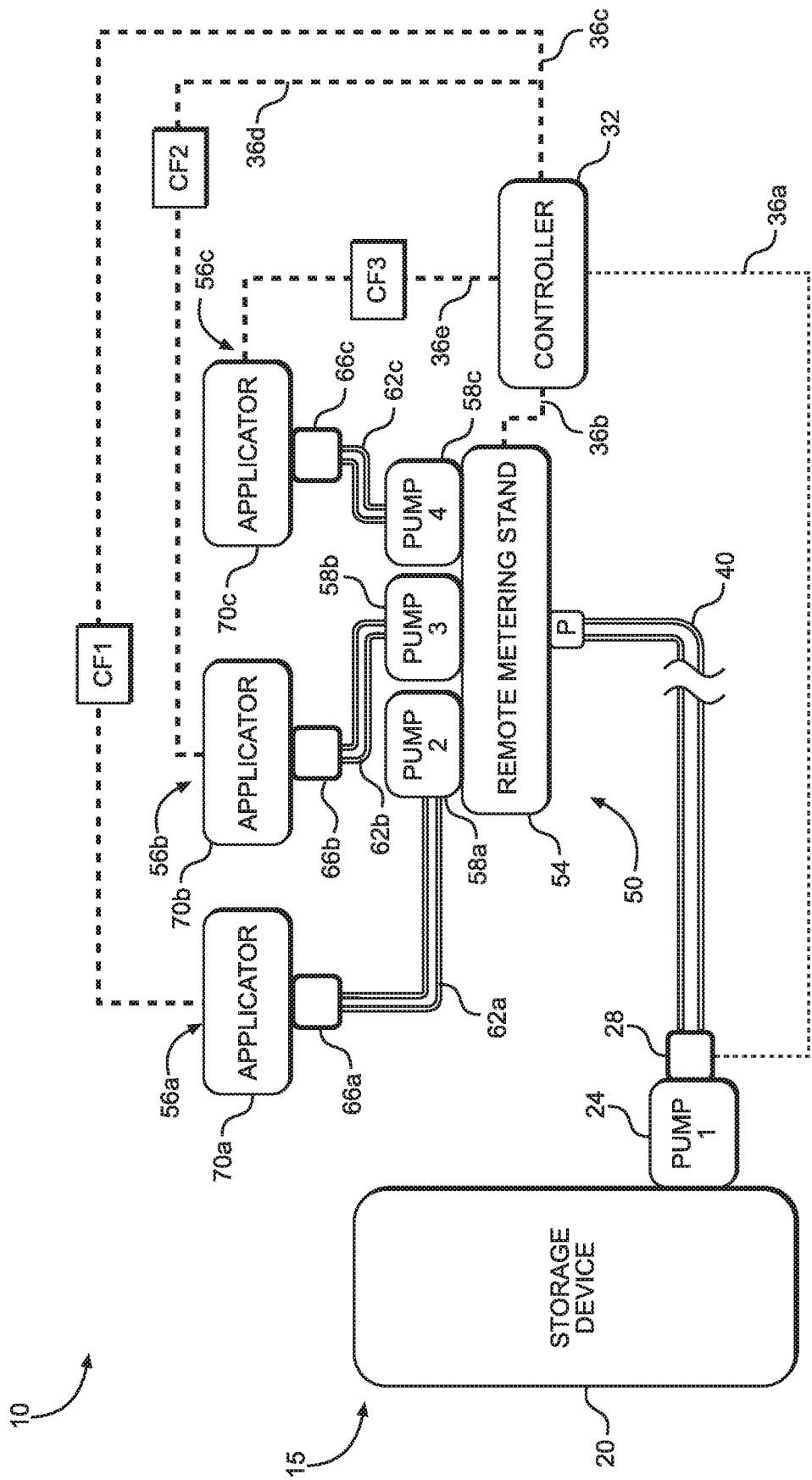
FIG. 5 is a schematic view of the application system shown in FIG. 1, with the controller performing a monitoring operation on the flow sensors of each applicator.

After the calibration operation has been performed, the controller 32 can direct the components of the application system 10 to engage in normal, steady state operation (shown in FIG. 5). During steady-state operation material is pumped by the main pump 24 from the storage device 20 to the remote metering system 50, where the remote metering stand 54 divides the material flow into separate flow portions. In the depicted embodiment, the remote metering stand 54 can divide the material flow into a first portion that is provided to the first applicator 70a, a second portion that is provided to the second applicator 70b, and a third portion that is provided to the third applicator 70c. However, in operation the number of flow portions can vary with then number of applicator assemblies included in the applicator system 10, as described above. Each of the first, second, and third flow portions can have specific characteristics based upon the intended dispensing operation to be performed by the applicator 70a-70c to which the particular flow portion is being directed to. These characteristics can be changed by the remote metering stand 54 upon automatic and/or manual direction from the controller 32.

During the steady state operation, the RMS pumps 58a-58c of each of the respective applicator assemblies 56a-56c can meter the portion of the material flow that is provided to that respective applicator assembly. As such, the rate of material flowing through each of the applicator assemblies 56a-56c is not limited to the speed at which the material enters the applicator assemblies 56a-56c after being pumped by the main pump 24. In operation, the first RMS pump 58a can pump the first portion of the material flow through the first applicator assembly 56a at a first speed, the second RMS pump 58b can pump the second portion of the material flow through the second applicator assembly 56b at a second speed, and the third RMS pump 58c can pump the third portion of the material flow through the third applicator assembly 56c at a third speed. The first, second, and third speeds can be the same or different as desired, depending on the requirements of each individual dispensing operation. Further, the pump displacement (output per revolution) of each of the RMS pumps 58a-58c can be the same or different as desired.

To ensure the first, second, and third speeds maintain consistent flow through an application process, the controller 32 can perform a monitoring operation. During the monitoring operation, the controller 32 is configured to direct the main pump 24 to pump the first portion of material flow to the first applicator 70a and the second portion of the material flow to the second applicator 70b. The controller 32 can also be configured to direct the main pump 24 to pump the third portion of the material flow to the third applicator 70c. During this time, the flow sensors 66a-66c can provide the controller 32 with feedback signals indicative of the characteristics of each portion of the material flow at discrete moments in time. As such, the controller 32 is configured to receive a feedback signal from the first flow sensor 66a that is indicative of a characteristic of the first portion of the material flow, a feedback signal from the second flow sensor 66b that is indicative of a characteristic of the second portion of the material flow, and/or a feedback signal from the third flow sensor 66c that is indicative of a characteristic of the third portion of the material flow. Each of these feedback signals can be modulated by the compensation factors described above (labeled as CF1, CF2, CF3 in FIG. 5).

Upon receiving these feedback signals, the controller 32 can compare them, and the characteristics that they represent, to intended characteristics for any of the first, second, and/or third portions of the material flow. Should any of the flow characteristics differ from the intended characteristic for a particular flow portion, the controller 32 can adjust the operation of the pump corresponding to that flow portion. For example, if the feedback signal from the first flow sensor 66a is indicative of a flow characteristic that does not match the intended characteristic for the first portion of the fluid flow, the controller 32 can adjust the operation of the first RMS pump 58a. Likewise, if the feedback signal from the second flow sensor 66b is indicative of a flow characteristic that does not match the intended characteristic for the second portion of the fluid flow, the controller 32 can adjust the operation of the second RMS pump 58b. Additionally, if the feedback signal from the third flow sensor 66c is indicative of a flow characteristic that does not match the intended characteristic for the third portion of the fluid flow, the controller 32 can adjust the operation of the third RMS pump 58c. Alternatively, the controller 32 can adjust the operation of the pump corresponding to a particular flow portion if the flow characteristic for that portion deviates from the intended characteristic more than a threshold amount, where the threshold amount can be selected by an operator of the application system 10 or determined by the controller 32. Further, the controller 32 can sum the feedback signals from the flow sensors 66a-66c and compare the summed signal to the feedback signal received from the main flow sensor 28. This can be done continuously and in real time to verify system integrity, which can be especially valuable given the high value of high speed production.

In addition or alternatively to the controller 32 adjusting the operation of the RMS pumps 58a-58c, the controller 32 or a related component can produce an alert when one of the feedback signals is indicative of a characteristic that is outside of a range or beyond a set deviation from the intended characteristic for that particular flow portion, as a certain magnitude of deviation can be indicative of a problem more serious than incorrect pump speed, such as a broken part or other defect within the application system 10, or can indicate a need to repeat the above-described calibration operations. The controller 32 can continue to perform the monitoring operation for as long as the application system 10 is applying material to substrates, and as such the controller 32 can continuously monitor the flow sensors 66a-66c and adjust operation of the RMS pumps 58a-58c as needed.

Figure 6:
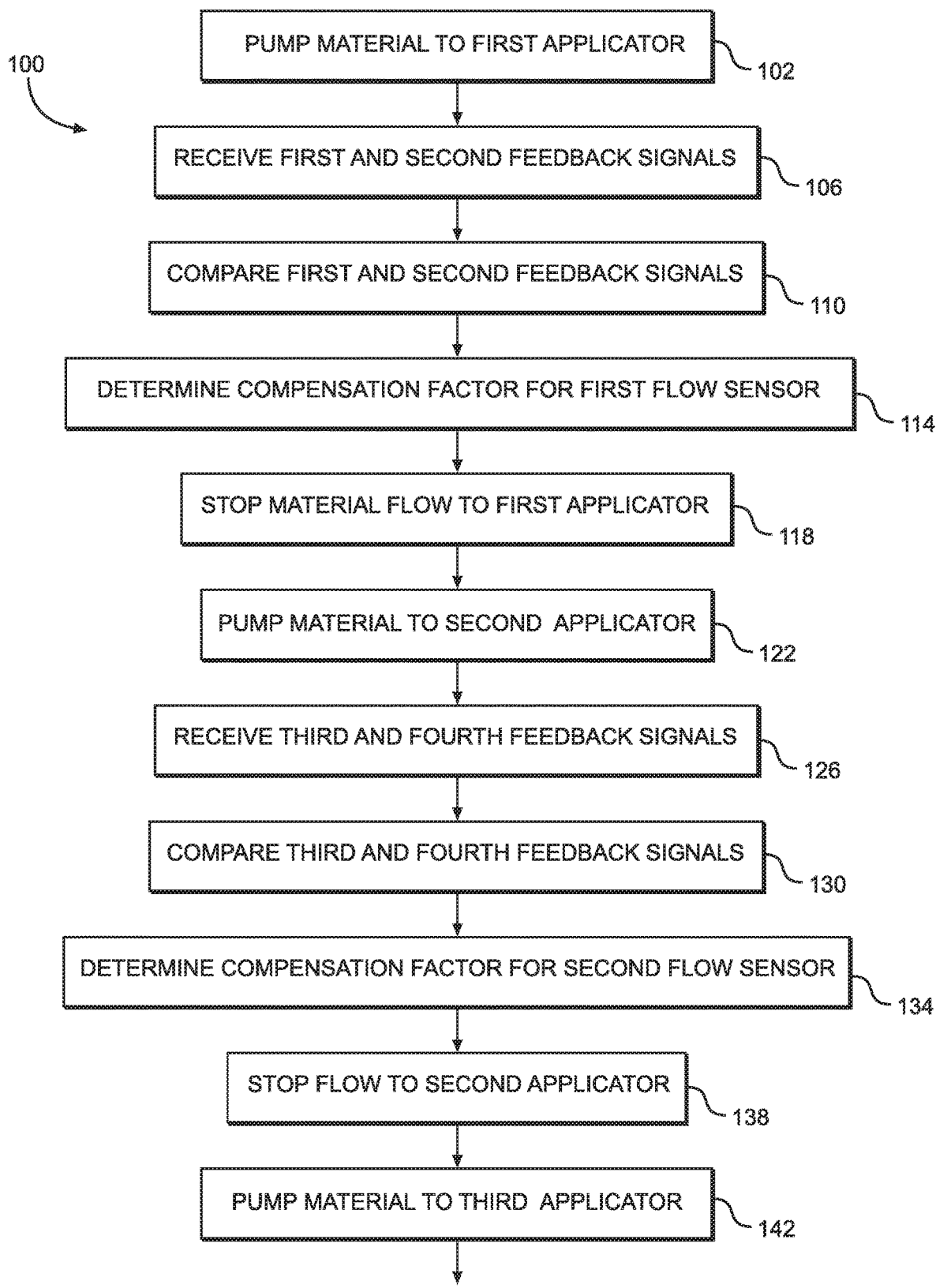
FIG. 6 is a process flow diagram of a method and system for calibrating a plurality of fluid sensors of an application system.
Figure 6:
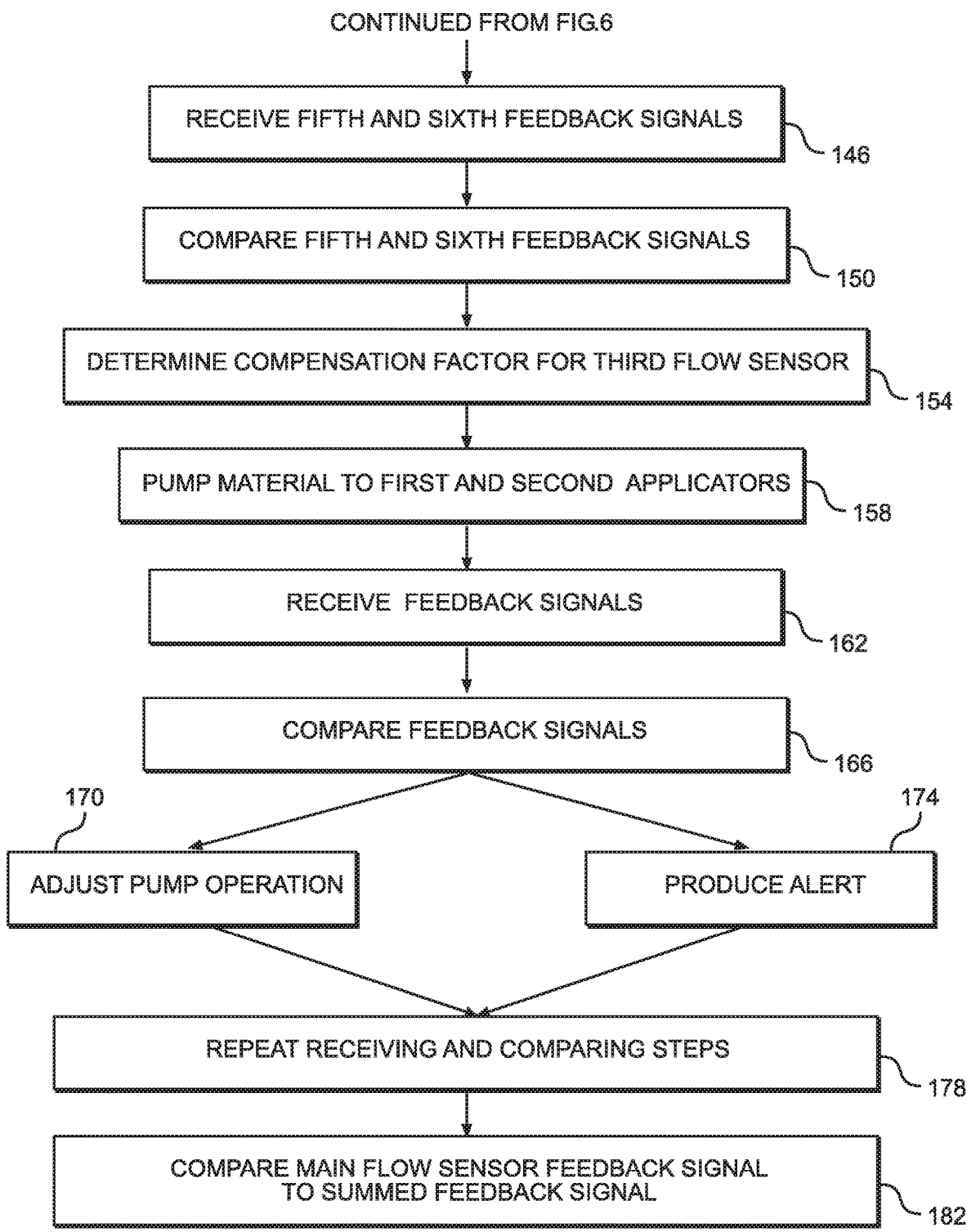

Continuing with FIG. 6, a method 100 of calibrating the flow sensors 66a-66c of the remote metering system 50 will be described. The method 100 first includes step 102, which comprises pumping material to a first applicator 70a. In step 102, the controller 32 can direct the main pump 24 to pump the material from the storage device 20 to the remote metering system 50, where the remote metering stand 54 directs the flow of material solely to the first applicator 70a, such that the first flow sensor 66a that is in fluid communication with the first applicator 70a can be calibrated. During step 102, only the first RMS pump 58a is operated; the second RMS pump 58b and third RMS pump 58c may not be operated. While the material is provided to only the first applicator 70a, step 106 can be performed. In step 106, the controller 32 receives a first feedback signal from the main flow sensor 28, which monitors a characteristic of the flow of material out of the main pump 24. The first feedback signal is indicative of the characteristic monitored by the main flow sensor 28. Additionally, in step 106 the controller 32 receives a second feedback signal from the first flow sensor 66a, which monitors the characteristic of the flow of material to the first applicator 70a. The second feedback signal is indicative of the characteristic monitored by the first flow sensor 66a.

After step 106, in step 110 the controller 32 compares the first and second feedback signals received from the main flow sensor 28 and the first flow sensor 66a, respectively. Ideally, the first and second feedback signals will represent identical material flow characteristics. However, in operation the first and second feedback signals may differ, which can be indicative of a flaw or other problem with the first flow sensor 66a. Should the first and second feedback signals differ by any amount or by a predetermined threshold, step 114 can be performed. In step 114, the controller 32 can determine a compensation factor for the first flow sensor 66a based on the differences between the first and second feedback signals. The compensation factor can compensate for deviation in the difference received from the main flow sensor 28 and first flow sensor 66a, and can be automatically applied to future feedback signals received by the controller 32 form the first flow sensor 66a. This compensation factor allows the controller 32, and likewise the operator of the application system 10, to most accurately monitor the flow characteristics of material flowing through the first applicator assembly 56a.

After the compensation factor for the first flow sensor 66a is determined, the controller 32 can then perform a similar analysis for the second flow sensor 66b. To do this, the controller 32 can direct the remote metering stand 54 to stop material flow to the first applicator 70a in step 118, and direct the remote metering stand 54 to direct all material flow from the main pump 24 to the second applicator 70b in step 122. During step 122, only the second RMS pump 58b is operated; the first RMS pump 58a and third RMS pump 58c may not be operated. While the material is provided to only the second applicator 70b, step 126 can be performed. In step 126, the controller 32 receives a third feedback signal from the main flow sensor 28, which monitors a characteristic of the flow of material out of the main pump 24. The third feedback signal is indicative of the characteristic monitored by the main flow sensor 28. Additionally, in step 126 the controller 32 receives a fourth feedback signal from the second flow sensor 66b, which monitor the characteristic of the flow of material to the second applicator 70b. The fourth feedback signal is indicative of the characteristic monitored by the second flow sensor 66b.

After step 126, in step 130 the controller 32 compares the third and fourth feedback signals received from the main flow sensor 28 and the second flow sensor 66b, respectively. Ideally, the third and fourth feedback signals will represent identical material flow characteristics. However, in operation the third and fourth feedback signals may differ, which can be indicative of a flaw or other problem with the second flow sensor 66b. Should the third and fourth feedback signals differ by any amount or by a predetermined threshold, step 134 can be performed. In step 134, the controller 32 can determine a compensation factor for the second flow sensor 66b based on the differences between the third and fourth feedback signals. The compensation factor can compensate for deviation in the feedback received from the main flow sensor 28 and second flow sensor 66b, and can be automatically applied to future feedback signals received by the controller 32 from the second flow sensor 66b. This compensation factor allows the controller 32, and likewise the operator of the application system 10, to most accurately monitor the flow characteristics of material flowing through the second applicator assembly 56b.

After the compensation factor for the first and second flow sensors 66a, 66b are determined, the controller 32 can then perform a similar analysis for the third flow sensor 66c. To do this, the controller 32 can direct the remote metering stand 54 to stop material flow to the second applicator 70b in step 138, and direct the remote metering stand 54 to direct all material flow from the main pump 24 to the third applicator 70c in step 142. During step 142, only the third RMS pump 58c may is operated; the first RMS pump 58a and second RMS pump 58b may not be operated. While the material is provided to only the third applicator 70c, step 146 can be performed. In step 146, the controller 32 receives a fifth feedback signal from the main flow sensor 28, which monitors a characteristic of the flow of material out of the main pump 24. The fifth feedback signal is indicative of the characteristic monitored by the main flow sensor 28. Additionally, in step 146 the controller 32 receives a sixth feedback signal from the third flow sensor 66c, which monitors the characteristic of the flow of material to the third applicator 70c. The sixth feedback signal is indicative of the characteristic monitored by the third flow sensor 66c.

After step 146, in step 150 the controller 32 compares the fifth and sixth feedback signals received from the main flow sensor 28 and the third flow sensor 66c, respectively. Ideally, the fifth and sixth feedback signals will represent identical material flow characteristics. However, in operation the fifth and sixth feedback signals may differ, which can be indicative of a flaw or other problem with the third flow sensor 66c. Should the fifth and sixth feedback signals differ by any amount or by a predetermined threshold, step 154 can be performed. In step 154, the controller 32 can determine a compensation factor for the third flow sensor 66c based on the differences between the fifth and sixth feedback signals. The compensation factor can compensate for deviation in the feedback received from the main flow sensor 28 and third flow sensor 66c, and can be automatically applied to future feedback signals received by the controller 32 from the third flow sensor 66c. This compensation factor allows the controller 32, and likewise the operator of the application system 10, to most accurately monitor the flow characteristics of material flowing through the third applicator assembly 56c.

After the previously described calibration steps are performed, the application system 10 can begin dispensing material onto substrates during normal operation. To begin this, in step 158 the controller 32 can instruct the main pump 24 to pump material to the remote metering system 50, where the remote metering stand 54 can divide the material flow into separate flow portions. In the present embodiment, in step 158 the remote metering stand 54 can divide the material flow into a first portion that is provided to the first applicator assembly 56a and a second portion that is provided to the second applicator assembly 56b. In step 158, the remote metering stand 54 can also divide the material flow into a third portion that is provided to the third applicator assembly 56c. Though three flow portions are explicitly described, in operation the number of flow portions can vary with then number of applicator assemblies included in the applicator system 10, as described above. Each of the first, second, and third flow portions can have specific characteristics based upon the intended dispensing operation to be performed by the applicator 70a-70c to which the particular flow portion is being directed to. These characteristics can be changed by the remote metering stand 54 upon automatic and/or manual direction from the controller 32.

In step 158, each of the RMS pumps 58a-58c can meter the portion of the material flow that is provided to its respective applicator assembly. As such, the rate of material flowing through each of the applicators 70a-70c is not limited to the speed at which the material enters the applicator assemblies 56a-56c after being pumped by the main pump 24. In operation, the first RMS pump 58a can pump the first portion of the material flow through the first applicator assembly 56a at a first speed, the second RMS pump 58b can pump the second portion of the material flow through the second applicator assembly 56b at a second speed, and the third RMS pump 58c can pump the third portion of the material flow through the third applicator assembly 56c at a third speed. The first, second, and third speeds can be the same or different as desired, depending on the requirements of each individual dispensing operation.

In step 162, the controller 32 can perform a monitoring operation to ensure the first, second, and third speeds maintain consistent and do not deviate from intended levels throughout an application process. This can include the controller 32 receiving feedback signals from the flow sensors 66a-66c that are indicative of the characteristics of each flow portion at discrete moments in time. In particular, in step 166 the controller 32 can receive a feedback signal from the first flow sensor 66a that is indicative of a characteristic of the first portion of the material flow, a feedback signal from the second flow sensor 66b that is indicative of a characteristic of the second portion of the material flow, and/or a feedback signal from the third flow sensor 66c that is indicative of a characteristic of the third portion of the material flow. It should be noted that each or any combination of the flow sensors 66a-66 can be operated during the monitoring operation using a compensation factor determined by the controller 32 during the calibration operation.

Upon receiving these feedback signals as modulated by the compensation factors, the controller 32 can compare the modulated feedback signals and the characteristics that they represent in step 166. This comparison can be made against the intended characteristics for any of the first, second, and/or third portions of the material flow. Should any of the flow characteristics differ from the intended characteristic for a particular flow portion, the controller 32 can adjust the operation of the pump corresponding to that flow portion in step 170. For example, step 170 can involve adjusting operation of the first RMS pump 58a if the feedback signal from the first flow sensor 66a is indicative of a flow characteristic that does not match or differs from by a threshold amount the intended characteristic for the first portion of the fluid flow. Additionally, step 170 can involve adjusting operation of the second RMS pump 58b if the feedback signal from the second flow sensor 66b is indicative of a flow characteristic that does not match or differs from by a threshold amount the intended characteristic for the second portion of the fluid flow. Further, step 170 can involve adjusting operation of the third RMS pump 58c if the feedback signal from the third flow sensor 66c is indicative of a flow characteristic that does not match or differs from by a threshold amount the intended characteristic for the third portion of the fluid flow. In addition or alternatively to step 170, the controller 32 can produce an alert when one of the feedback signals is indicative of a characteristic that is outside of a range or beyond a set deviation from the intended characteristic for that particular flow portion in step 174. This alert can indicate a part within the application system 10 has failed and needs to be replaced, or that any number of the flow sensors 66a-66c requires recalibration. After either or both of steps 170, 174 is performed, the controller 32 can continuously monitor the flow sensors 66a-66c and adjust operation of the RMS pumps 58a-58c as needed in step 178. This can include continuously or intermittently receiving feedback signals from the flow sensors 28 and 66a-66c, and/or adjusting operation of the RMS pumps 58a-58c. Further, during steady state operation, step 182 can be performed, in which the controller 32 sums the feedback signals from the flow sensors 66a-66c and compares the summed signal to the feedback signal received from the main flow sensor 28. As stated above, this can be done continuously and in real time to verify system integrity, which can be especially valuable given the high value of high speed production.

The above described system and method for calibrating and monitoring flow sensors in an application system involving multiple applicators helps ensure accuracy and consistency throughout the entirety of a dispensing process. The types of sensors that are typically utilized as flow sensors 66a-66c can be compact and low-cost, which can allow them to be placed within the applicator assembly 56a-56c up to the point of application. However, such sensors may not have the same level of accuracy as the type of sensors typically utilized as the main flow sensor 28, such as gear-type flow sensors. As such, by determining compensation factors for the flow sensors 66a-66c according to the methods described above, the application system 10 can best leverage the accuracy of the main flow sensor 28 to ensure flow accuracy and consistency is maintained up to the point of application. Further, by monitoring the flow portions during an application process after calibration, discrepancies between intended and actual flow characteristics can be corrected by the controller 32 quickly and in real time.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Still further, exemplary or representative values and ranges may be included to assist in understanding the present disclosure; however, such values and ranges are not to be construed in a limiting sense and are intended to be critical values or ranges only if so expressly stated. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed:

1. A method of calibrating a plurality of fluid sensors of a remote metering system, the method comprising:
   pumping material from a main pump to a first applicator;
   receiving a first feedback signal from a main flow sensor in communication with the main pump and a second feedback signal from a first flow sensor in communication with the first applicator, wherein the first and second feedback signals are indicative of characteristics of material flow through the main pump and the first applicator, respectively;
   comparing the first and second feedback signals;
   determining a compensation factor for the first flow sensor;
   stopping material flow to the first applicator;
   pumping the material from the main pump to a second applicator;
   receiving a third feedback signal from the main flow sensor and a fourth feedback signal from a second flow sensor in communication with the second applicator, wherein the third and fourth feedback signals are indicative of characteristics of the material flow through the main pump and the second applicator, respectively;
   comparing the third and fourth feedback signals; and
   determining a compensation factor for the second flow sensor.

2. The method of claim 1, further comprising:
   stopping the material flow to the second applicator;
   pumping the material from the main pump to a third applicator;
   receiving a fifth feedback signal from the main flow sensor and a sixth feedback signal from a third flow sensor in communication with the third applicator, wherein the fifth and sixth feedback signals are indicative of characteristics of the material flow through the main pump and the third applicator, respectively;
   comparing the fifth and sixth feedback signals; and
   determining a compensation factor for the third flow sensor.

3. The method of claim 1, further comprising:
   pumping a first portion of the material flow to the first applicator and a second portion of the material flow to the second applicator;
   receiving a fifth feedback signal from the first flow sensor and a sixth feedback signal from the second flow sensor; and
   comparing the fifth and sixth feedback signals to intended characteristics for the first and second portions of the material flow, respectively.

4. The method of claim 3, further comprising:
   producing an alert when one of the fifth and sixth feedback signals is indicative of a characteristic that is outside of a predetermined range.

5. The method of claim 3, further comprising:
   repeating the third receiving and comparing steps continuously.

6. The method of claim 3, further comprising:
   adjusting operation of a first remote metering stand pump in fluid communication with the first applicator when the fifth feedback signal is indicative of a characteristic that does not match the intended characteristic for the first portion.

7. The method of claim 1, wherein the first, second, third, and fourth feedback signals are proportional to a volumetric flow rate of the material flow.

8. The method of claim 1, wherein the first, second, third, and fourth feedback signals are proportional to a mass flow rate of the material flow.

9. The method of claim 1, wherein the main flow sensor is a gear flow meter.

10. The method of claim 1, wherein the receiving the first feedback signal and the second feedback signal occurs while the main pump pumps material to the remote metering system and while the remote metering system directs material flow to only a first supply line that transfers the material to the first applicator;
    wherein the stopping material flow to the first applicator occurs after receiving the first feedback signal and the second feedback signal; and
    wherein the receiving the third feedback signal and the fourth feedback signal occurs after material flow to the first applicator is stopped, while the main pump pumps material to the remote metering system, while material flow is not directed by the remote metering system to the first applicator, and while the remote metering system directs material flow to only a second supply line that transfers the material to the second applicator.

11. An application system for applying a material to a substrate, the application system comprising:
    a material supply device comprising a main pump and a main flow sensor for monitoring an output of the main pump;
    a remote metering system for receiving the material flowing from the material supply device and applying the material to substrates, the remote metering system comprising:
       a first applicator assembly including a first applicator and a first flow sensor for monitoring an output of the first applicator;
       a second applicator assembly including a second applicator and a second flow sensor for monitoring an output of the second applicator; and
    a controller in signal communication with the remote metering station system and the material supply device, wherein the controller is configured to:
       1) perform a first calibration operation, where the controller is configured to a) direct the main pump to pump the material to the first applicator, b) receive a first feedback signal from the main flow sensor and a second feedback signal from the first flow sensor, c) compare the first and second feedback signals, and
d) determine a compensation factor for the first flow sensor;
2) stop material flow to the first applicator; and
3) perform a second calibration operation, where the controller is configured to a) direct the main pump to pump the material to the second applicator, b) receive a third feedback signal from the main flow sensor and a fourth feedback signal from the second flow sensor, c) compare the third and fourth feedback signals, and d) determine a compensation factor for the second flow sensor.

12. The application system of claim 11, wherein the remote metering system further comprises:
a third applicator assembly including a third applicator and a third flow sensor for monitoring an output of the third applicator.

13. The application system of claim 12, wherein the controller is further configured to:
4) stop material flow to the second applicator; and
5) perform a third calibration operation, where the controller is configured to a) direct the main pump to pump the material to the third applicator, b) receive a fifth feedback signal from the main flow sensor and a sixth feedback signal from the third flow sensor, c) compare the fifth and sixth feedback signals, and d) determine a compensation factor for the third flow sensor.

14. The application system of claim 11, wherein the controller is further configured to:
4) perform a monitoring operation, where the controller is configured to a) direct the main pump to pump a first portion of material flow to the first applicator and a second portion of the material flow to the second applicator, b) receive a fifth feedback signal from the first flow sensor and a sixth feedback signal from the second flow sensor, and c) compare the fifth and sixth feedback signals to intended characteristics for the first and second portions of the material flow, respectively.

15. The application system of claim 14, wherein the first applicator assembly includes a first remote metering stand pump in fluid communication with the first applicator, the controller being further configured to adjust operation of the first remote metering stand pump when the fifth feedback signal is indicative of a material flow characteristic that does not match the intended characteristic for the first portion of the material flow.

16. The application system of claim 15, wherein the second applicator assembly includes a second remote metering stand pump in fluid communication with the second applicator, the controller being further configured to adjust operation of the second remote metering stand pump when the sixth feedback signal is indicative of a material flow characteristic that does not match the intended characteristic for the second portion of the material flow.

17. The application system of claim 14, wherein the controller is configured to sum the fifth and sixth feedback signals to create a summed feedback signal and compare the summed feedback signal to a seventh feedback signal received from the main flow sensor.

18. The application system of claim 11, wherein the first, second, third, and fourth feedback signals are proportional to a volumetric flow rate of the material.

19. The application system of claim 11, wherein the first, second, third, and fourth feedback signals are proportional to a mass flow rate of the material.

20. The application system of claim 11, wherein the controller is configured to:
1) perform the first calibration operation, while material flow is not directed by the remote metering system to the second applicator, where the controller is configured to a) direct the main pump to pump the material to the remote metering system to direct material flow to only a first supply line that fluidly connects the remote metering system to the first applicator;
2) stop material flow to the first applicator, after the first calibration operation is performed; and
3) perform the second calibration operation, after material flow to the first applicator is stopped and while material flow is not directed by the remote metering system to the first applicator, where the controller is configured to a) direct the main pump to pump the material to the remote metering system to direct material flow to only a second supply line that fluidly connects the remote metering system to the second applicator.

\* \* \* \* \*